United States Patent Office 2,923,712
Patented Feb. 2, 1960

2,923,712

1-(4-ISOPENTYLOXY-PHENYL) - 3 - [4-(2-PYRIDYL)-PHENYL] - 2 - THIOUREA AND THERAPEUTICALLY USEFUL ACID ADDITION SALTS

Renat Herbert Mizzoni, Chester, N.J., assignor to Ciba Pharmaceutical Products, Inc., Summit, N.J., a corporation of New Jersey No Drawing. Application July 25, 1958
Serial No. 750,865

2 Claims. (Cl. 260—294.8)

The present invention relates to a thiourea compound, particularly to 1-(4-isopentyloxy-phenyl)-3-[4-(2-pyridyl)-phenyl]-2-thiourea of the formula

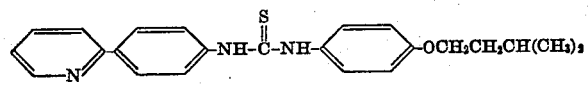

and the salts thereof.

Salts are particularly the therapeutically useful acid addition salts with inorganic acids, such as, for example, hydrochloric, hydrobromic, sulfuric or phosphoric acids, or organic acids, such as, for example, acetic, hydroxyacetic, oxalic, tartaric, citric, benzoic, acetoxybenzoic, salicylic, 4-aminosalicylic, methane sulfonic acid or the like.

1 - (4 - R-0-phenyl)-3-(4-pyridyl-phenyl)-thioureas, in which R stands for normal butyl or isobutyl, have been described in U.S. Patent 2,820,039 to have tuberculostatic effects. It has now been found that the compound of this invention and its salts are markedly superior to the compounds of the above-mentioned patent, such as the specifically mentioned 1-(4-isobutyloxy-phenyl)-3-[4-(2-pyridyl)-phenyl]-2-thiourea, with respect to its tuberculostatic activity. The compounds of the invention are, therefore, intended to be used as tuberculostatic agents of low toxicity in the treatment of infections caused by *Mycobacterium tuberculosis*, such as the human pathogenic strain H 37 Rv of *Mycobacterium tuberculosis*.

The new compound may be used as a tuberculostatic medicament in the form of pharmaceutical preparations, which contain the new compound or a salt thereof in admixture with a pharmaceutical organic or inorganic, solid or liquid carrier suitable for enteral, e.g. oral, or parenteral administration. For making up such preparations there may be employed substances which do not react with the new compound, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form, for example, as tablets, dragees or capsules, or in liquid form, for example, as solutions, emulsions or suspensions. If desired, they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic agents, such as streptomycin, dihydrostreptomycin, isonicotinic acid hydrazide, 4-amino-salicylic acid, other thiourea derivatives, etc.

The thiourea compound of this invention may be prepared by reacting 4-isopentyloxy-phenylisothiocyanate with 4-(2-pyridyl)-aniline. The reaction is preferably carried out in the presence of a solvent, such as a lower alkanol, e.g. methanol or ethanol; a lower alkanone, e.g. acetone or ethyl methyl ketone; or an ether, e.g. p-dioxane. It may be performed at room temperature, or at an elevated temperature, for example, under reflux, with lower reaction time.

Depending on the conditions, the thiourea compound of this invention is obtained in the form of the free base or a salt thereof. A salt is converted into the free base, for example, by treatment with an aqueous alkaline reagent, such as an alkali metal hydroxide, e.g. lithium, sodium or potassium hydroxide; an alkali metal carbonate, e.g. sodium or potassium carbonate or hydrogen carbonate; or ammonia. A free base may be converted into a salt thereof, for example, by reacting a solution of the base in a solvent, such as a lower alkanol, e.g. methanol or ethanol, with the acid or a solution thereof.

This is a continuation-in-part application of my parent application Serial No. 714,963 of February 13, 1958, now abandoned.

The following example illustrates the invention; temperatures are given in degrees centigrade.

*Example*

A solution of 3.4 g. of 4-(2-pyridyl)-aniline and 4.4 g. of 4-isopentyloxy-phenylisothiocyanate in 15 ml. of methanol is refluxed for fifteen minutes. The white precipitate, formed upon chilling, is filtered off and washed with ether. A second crop of crystalline material is obtained by diluting the filtrate with ether. The combined crops are dissolved in chloroform, the solution filtered through silicic acid and the filtrate diluted with pentane. The crystalline 1 - (4 - isopentyloxy-phenyl)-3-[4-(2-pyridyl)-phenyl]-2-thiourea is filtered off, washed with pentane and dried, M.P. 128–128.5°; yield: 2.9 g.

The hydrochloride of 1-(4-isopentyloxy-phenyl)-3-[4-(2-pyridyl)-phenyl]-2-thiourea may be prepared by treating an ethanol solution of the free base with hydrogen chloride and diluting the solution with ether.

What is claimed is:
1. A member of the group consisting of 1-(4-isopentyloxy-phenyl) - 3 - [4 - (2-pyridyl)-phenyl]-2-thiourea and therapeutically useful acid addition salts thereof.
2. 1 - (4 - isopentyloxy - phenyl) - 3 - [4 - (2 - pyridyl)-phenyl]-2-thiourea.

References Cited in the file of this patent
UNITED STATES PATENTS

| | | |
|---|---|---|
| 2,702,821 | Huebner et al. | Feb. 22, 1955 |
| 2,820,039 | Doub et al. | Jan. 14, 1958 |

OTHER REFERENCES

Welsch et al.: Chem. Abstracts, vol. 50, p. 11512 (1956).